United States Patent [19]

Bolter et al.

[11] 4,211,599
[45] Jul. 8, 1980

[54] CUT-AND-WELD DEVICE FOR SUPERIMPOSED FOILS ADVANCED IN THE FORM OF STRIPS

[75] Inventors: German Bolter, Neuffen; Herbert Helmle; Hans Beck, both of Nurtingen, all of Fed. Rep. of Germany

[73] Assignee: Hans Beck, Nurtingen, Fed. Rep. of Germany

[21] Appl. No.: 959,836

[22] Filed: Nov. 13, 1978

[30] Foreign Application Priority Data

Nov. 16, 1977 [DE] Fed. Rep. of Germany ....... 2751118

[51] Int. Cl.² ............................................. B32B 31/18
[52] U.S. Cl. ..................................... 156/494; 53/373; 93/33 H; 93/DIG. 1; 156/499; 156/515; 156/583.5
[58] Field of Search ..................... 156/515, 251, 583.5, 156/88, 494, 499; 53/373; 93/33 H, DIG. 1

[56] References Cited

U.S. PATENT DOCUMENTS

| 2,711,780 | 6/1955 | Hakomaki | 156/515 |
|---|---|---|---|
| 2,781,079 | 2/1957 | Ruby et al. | 156/515 |
| 3,106,502 | 10/1963 | Starger et al. | 156/515 |
| 3,142,608 | 7/1964 | Techtmann et al. | 156/515 |
| 3,355,337 | 11/1967 | Zelnick | 156/515 |
| 3,420,727 | 1/1969 | Beck | 156/515 |

*Primary Examiner*—Wityshyn
*Attorney, Agent, or Firm*—Lawrence E. Laubscher

[57] ABSTRACT

A cut-and-weld device has two pairs of conveyor belts which run parallel to one another and grip and convey superimposed foils. A foil support plane is defined by the nip between the belts. A cutter is mounted between the pairs of belts and extends through the foil support plane so as to cut the foils as they pass along the plane. The blade is also heated, so that the foils are simultaneously welded together. In addition, a tension rail with an upper edge is positioned adjacent the cutter, and pushes the foils in the opposite direction out of the foil support plane, so as to tension the foils to assist the cutter in cutting the foils and to keep the cut and welded edges separate.

4 Claims, 3 Drawing Figures

CUT-AND-WELD DEVICE FOR SUPERIMPOSED FOILS ADVANCED IN THE FORM OF STRIPS

FIELD OF THE INVENTION

The invention relates to a cut-and-weld device for superimposed foils advanced in the form of strips, which are clamped between pairs of belts and are stretched over a foil support. Such devices have a heated cutter which provides the foils advanced against it with a separating weld seam and which extends into a recess in the foil support, and a tension rail which extends substantially parallel to the feed direction, for tensioning and separating the foils transversely of the feed direction.

BACKGROUND OF THE INVENTION

In a known cut-and-weld device (German Offenlegungsschrift No.1,454,991) two foils to be welded together are stretched over a foil support between adjacently extending pairs of driver belts over a groove in the foil support into which a cut-and-weld cutter extends to provide the two foils with a separating weld seam. The pairs of driver belts produce a certain tensioning of the foils transversely of the feed direction; however, in many cases this tensioning is insufficient to produce a clean separating weld seam. In particular during rapid advance of the foils it may happen that the portions to be separated by the cut-and-weld cutter are located so close together again behind the cutter that when the foil material which had been softened by the cut-and-weld cutter solidifies, a connection * of the adjacently guided strips occurs again, so that the desired separation does not take place.

In order to provide a remedy therefor, attempts have already been made to lower a tensioning member from above upon the foil behind the cut-and-weld cutter in the feed direction, and to cause it to engage into groove in the foil support. Thereby a certain additional tension results transversely of the feed direction and an improved separation of the foil portions; however, new problems are produced thereby. Thus such a tensioning element which is frequently constructed in the form of a tension rail easily causes an accumulation of material behind the cut-and-weld cutter, such accumulation being due to the fact that the foil portions fed towards the tension rail do not travel smoothly past the latter, but adhere thereto. For this reason such a device can be operated only at relatively low feed speeds. Moreover, even with such tensioning elements a satisfactory separation of the foil portions behind the cut-and-weld cutter is still not obtained.

OBJECT OF THE INVENTION

The invention seeks to improve the devices of the kind described above, in such a manner that an efficient separation of the foil portions occurs behind the cut-and-weld cutter without the risk of an accumulation of the advanced foil portions.

SUMMARY OF THE INVENTION

According to the invention, there is provided a cut-and-weld device for cutting and welding superimposed foils, the device comprising: two spaced pairs of travelling belts for gripping and continuously conveying the foils through the device along a foil support plane; a cutter extending through the foil support plane between the pairs of belts; means for heating the cutter; and a tension rail extending from a position upstream of the cutter, parallel to the belts and the cutter, between the two pairs of belts, and having an edge extending through the foil support plane and inclined to said plane such that the distance between said edge and said plane increases in the direction of conveying.

In a preferred embodiment of the invention, the tension rail projects upwardly beyond the foil support plane. In this embodiment its edge thus rises in the feed direction.

It is advantageous when the tension rail is adjustable relatively to the foil support in respect of height and inclination.

BRIEF DESCRIPTION OF THE DRAWING

The invention will now be further described, by way of example, with reference to the accompanying drawing, in which.

DESCRIPTION OF A PREFERRED EMBODIMENT

Figure 1:
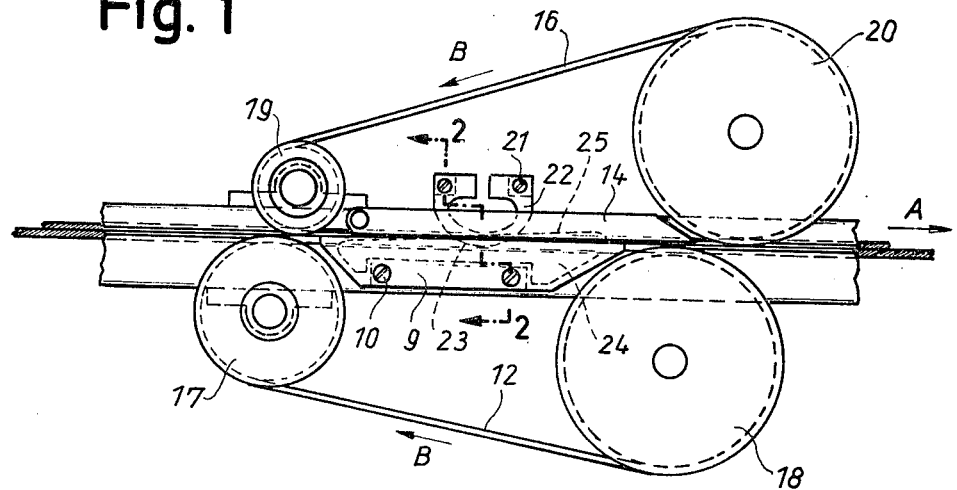
FIG. 1 is a side view of a cut-and-weld device according to the invention.
Figure 2:
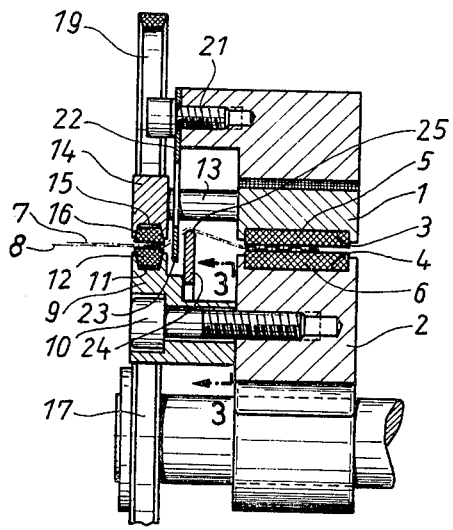
FIG. 2 is a view in section on the line 2—2 in FIG. 1.
Figure 3:
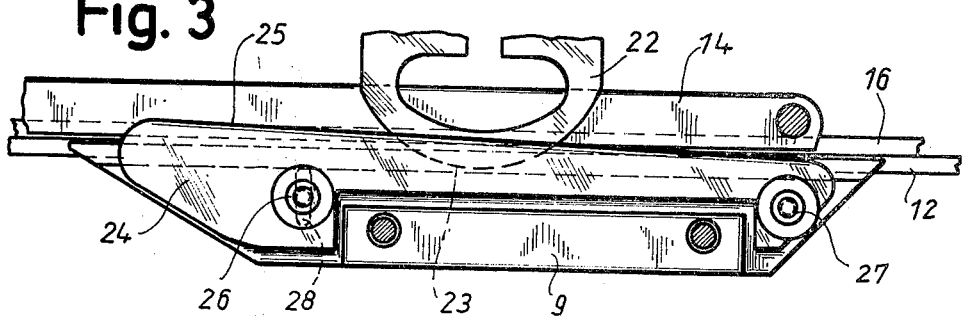
FIG. 3 is a view in section on the line 3—3 in FIG. 2.

The cut-and-weld device illustrated in the drawing is employed, for example in packaging machines, at the edges of foil webs which receive between them an article to be packaged. The cut-and-weld device welds together the foils surrounding the article and cuts off the projecting portion of the foil webs. Below, only one of the cut-and-weld devices on one side of a foil web is described with reference to the drawing.

Endlessly driven belts 5 and 6, merely partially illustrated in the drawing, extend between an upper guide 1 and a lower guide 2 in guide grooves 3 and 4, respectively. They are pressed against each other by the guides 1 and 2, and hold between them the edge regions of foil webs 7 and 8 and convey them in the direction of the arrow A through the region of the cut-and-weld device.

The lower guide 2 has attached thereto by means of screws 10 a solid metal, foil support member 9 which is part of the cut-and-weld device and which comprises on its upper surface a groove 11 of trapezoidal cross-section which accommodates an endless belt 12 likewise of trapezoidal cross-section. In the same manner the upper guide 1 has arranged thereon by means of screws 13 a depresser rail 14 the lower side of which opposite the groove 11 is provided with a groove 15 of trapezoidal cross-section in which a belt 16 is guided. The belts 12 and 16 being endless belts are guided around guide rollers 17, 18, 19, 20, driven in the direction of the arrows B and pressed against each other between the depresser rail 14 and the foil support member 9; they clamp between them the foil webs 7 and 8. The feed speed of all the belts 12, 16, 5, 6 is the same. A foil support plane is defined by the nips between belts 12 and 16, and between belts 5 and 6.

The upper guide has attached thereto by means of screws 21 a cut-and-weld cutter 22 which has a U-shaped contour and the ends of which are connected to a voltage source in a manner not illustrated in the drawing, so that the cut-and-weld cutter can be heated. The lower edge 23 of the cut-and-weld cutter extends into a recess which runs parallel to the groove 11 and terminates below the foil support plane. In other words, the cut-and-weld cutter presses the two foil webs below their support plane.

A tensioning element or a tension rail 24 is attached to the foil support member 9 and extends adjacent the cut-and-weld cutter 22; the upper edge 25 of the element or rail 24 projects upwardly above the foil support plane. The tension rail 24 begins in front of the cut-and-weld cutter 22 in the feed direction and ends behind the same in the feed direction. The upper edge 25 of the rail rises in the feed direction so that its spacing from the foil support plane increases in the feed direction A.

The tension rail 24 is fixed by means of screws 26 and 27 to the foil support member 9 in such a manner that its height and its inclination relative to the foil support member 9 is adjustable. For this purpose the tension rail has an elongate hole 28.

In the operation of the cut-and-weld device described, the superimposed foil webs are clamped between the belts 5 and 6 and the belts 12 and 16, and are tensioned transversely to the feed direction by this clamping. This transverse tension is increased by the fact that upon advance the two foils come into abutment with the upper edge 25 of the tension rail 24 which guides the two foils above the foil support plane. Owing to the clamping of the two foils between the pairs of belts located on both sides of the tension rail 24, an increased transverse tension results. In this case the transverse tension increases steadily in the feed direction owing to the rising disposition of the upper edge 25 of the tension rail 24. Upstream of the cut-and-weld cutter, a transverse tension is thus produced which is large enough to prevent with certainty a formation of folds in the superimposed foils, but which is not so large that the foil material itself is permanently deformed.

In the region of the cut-and-weld cutter itself a relatively large transverse tension results, since the cut-and-weld cutter presses from above on the foil.

In the region downstream of the cut-and-weld cutter the further increased transverse tension ensures that the two foil portions are reliably separated from each other along the weld seam heated and rendered plastic by the heated cut-and-weld cutter.

The gradual increase of the transverse tension in the feed direction prevents an accumulation of the advanced foil webs, since no discontinuities occur on the entire web path.

Depending upon requirements, for example feed speed and foil thickness, the transverse tension additionally produced by the tension rail may be adjusted by appropriate adjustment of the height and the inclination of the tension rail. For this purpose it is only necessary to loosen the screws 26 and 27, and to tighten them again after the desired positioning of the tension rail.

In the illustrated embodiment, the foils are gripped on one side between belts 5 and 6 and on the other side between belts 12 and 16. It is also possible to provide between the belts 12 and 16 and the belts 5 and 6 two further belts which additionally clamp between them the foils on the side of the cut-and-weld cutter lying opposite the belts 12 and 16, such as provided in the cut-and-weld device described in the German Offenlegungsschrift No. 1,454,991 referred to above.

It is an advantage of the device according to the invention that the tension rail which produces the additional transverse tension can be easily incorporated into existing cut-and-weld devices.

In the cut-and-weld device described, the foil comes into contact with the tension rail ahead of the cut-and-weld cutter, and an accumulation of the foils is avoided with certainty. Furthermore, the inclined disposition of the tension rail leads to the fact that a relatively small tension transverse of the feed direction is exerted on the foil in the region ahead of the cut-and-weld cutter, whereas behind the cut-and-weld cutter,that is to say after the formation of the separating weld seam to the two foil portions are separated from each other with a relatively great force. Owing tothe gradual increase of the transverse tension, any irregularity is avoided which might cause an accumulation of the foil.

We claim:

1. Apparatus for cutting and welding a pair of superimposed foil layers, comprising
   (a) first and second laterally spaced pairs of adjacent endless belts each having adjacent horizontal runs for gripping and conveying the superimposed foil layers in a given horizontal direction in a common generally horizontal plane defined between said horizontal runs;
   (b) heated cutting means arranged between and extending parallel with said spaced pairs of belts above and generally normal to said plane and extending downwardly therethrough for cutting the foil layers and simultaneously welding together the cut edges of the superimposed foil layers; and
   (c) tension rail means arranged between and extending parallel with said spaced pairs of belts below and generally normal to said plane, said rail means extending continuously from a position upstream of said cutting means to a position downstream of said cutting means, the upper edge of said rail means being inclined and extending upwardly through said plane in said given direction, whereby as the superimposed foil layers are gripped and conveyed by said spaced pairs of belts along said tension rail means, the transverse tension on the foil layers increases along the length of said rail means to prevent the folding of the superimposed foil layers, and said heated cutting means cuts and welds the superimposed foil layers together.

2. Apparatus for cutting and welding a pair of superimposed foil layers, comprising
   (a) first and second laterally spaced pairs of adjacent endless belts each having adjacent horizontal runs for gripping and conveying the superimposed foil layers in a given horizontal direction in a common generally horizontal plane defined between said horizontal runs;
   (b) heated cutting means arranged between and extending parallel with said spaced pair of belts generally normal to said plane and extending therethrough for cutting the foil layers and simultaneously welding together the cut edges of the superimposed foil layers; and
   (c) tension rail means arranged between and extending parallel with said spaced pairs of belts and generally normal to said plane, said rail means further extending continuously from a position upstream of said cutting means to a position downstream ofsaid cutting means, one edge of said rail means extending through said plane and being inclined, the distance between said one edge and said plane beyond said cutting means increasing in said given direction, whereby as the superimposed foil layers are gripped and conveyed by said spaced pairs of belts along said tension rail means, the transverse tension on the foil layers increases along the length of said rail means to prevent the folding of the superimposed foil layers, and said heated cutting means cuts and welds the superimposed foil layers together.

3. Apparatus as defined in claim 2, and further comprising means for adjusting the inclination and distance of said rail one edge relative to said plane.

4. Apparatus as defined in claim 3, wherein said tension rail means is arranged adjacent said cutting means.

* * * * *